(12) United States Patent
Washington et al.

(10) Patent No.: US 10,740,151 B1
(45) Date of Patent: Aug. 11, 2020

(54) PARALLELIZED FORENSIC ANALYSIS USING CLOUD-BASED SERVERS

(71) Applicant: Amazon Technologies, Inc., Seattle, WA (US)

(72) Inventors: Ryan Washington, Leesburg, VA (US); Joe W. Pate, Seattle, WA (US); David Walker, Basingstoke (GB); Scott Conrad, Reston, VA (US); Mikhail Sosonkin, Bainbridge Island, WA (US); Matthew Evans, Arlington, VA (US); Nathan Kevin McCarthy, Washington, DC (US); Hugo Gabignon, Issaquah, WA (US); Victor Chin, Bellevue, WA (US); Joel Naomi Cornett, Fairfax, VA (US); Joshua Stephen Du Lac, Little Elm, TX (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 16/113,629

(22) Filed: Aug. 27, 2018

(51) Int. Cl.
| | | |
|---|---|---|
| *G06F 9/46* | (2006.01) | |
| *G06F 9/50* | (2006.01) | |
| *H04L 12/58* | (2006.01) | |
| *G06F 9/54* | (2006.01) | |
| *G06F 16/14* | (2019.01) | |

(52) U.S. Cl.
CPC ............ *G06F 9/5027* (2013.01); *G06F 9/542* (2013.01); *G06F 16/152* (2019.01); *H04L 51/08* (2013.01)

(58) Field of Classification Search
CPC ...... G06F 9/5027; G06F 16/152; G06F 9/542; H04L 51/08
See application file for complete search history.

(56) References Cited

U.S. PATENT DOCUMENTS

| | | | |
|---|---|---|---|
| 8,683,592 B1 * | 3/2014 | Dotan ................. | H04L 63/1408 709/224 |
| 2006/0059287 A1 * | 3/2006 | Rivard ................. | G06F 9/4411 710/300 |
| 2006/0095541 A1 * | 5/2006 | Sojian ................ | H04N 1/00352 709/217 |
| 2006/0149611 A1 * | 7/2006 | Diep ........................ | G06F 9/50 709/226 |
| 2011/0047230 A1 * | 2/2011 | McGee ............... | H04L 41/0609 709/206 |

(Continued)

*Primary Examiner* — Adam Lee
(74) *Attorney, Agent, or Firm* — Eversheds Sutherland (US) LLP

(57) ABSTRACT

Systems, methods, and computer-readable media are disclosed for systems and methods for parallelized forensic analysis using cloud-based servers. Example methods may include generating a first request for one or more notifications in a notification queue, where the one or more notifications include a first notification indicative of a first data input at a datastore, determining a first data type of the first data input, and generating a second notification indicative of the first data type. Some example methods may include determining that a first software component is subscribed to notifications for the first data type, sending the second notification to the first software component, determining a first output of the first software component, where the first output comprises a set of extracted data from the first data input, and sending the set of extracted data to the datastore.

20 Claims, 6 Drawing Sheets

(56) References Cited

U.S. PATENT DOCUMENTS

| | | | |
|---|---|---|---|
| 2011/0214133 A1* | 9/2011 | Lum | G06F 21/41 719/318 |
| 2013/0218940 A1* | 8/2013 | Shannon | H04L 65/40 709/201 |
| 2014/0032707 A1* | 1/2014 | Doshi | G06F 9/542 709/217 |
| 2014/0281741 A1* | 9/2014 | Bohacek | G06F 11/3409 714/47.3 |
| 2014/0317681 A1* | 10/2014 | Shende | H04L 63/10 726/1 |
| 2015/0128130 A1* | 5/2015 | Weaver | G06F 9/455 718/1 |
| 2015/0154501 A1* | 6/2015 | Boddhu | G06F 9/542 706/52 |
| 2016/0020959 A1* | 1/2016 | Rahaman | H04L 41/5006 709/224 |
| 2016/0034295 A1* | 2/2016 | Cochran | G06F 9/45558 718/1 |
| 2016/0080334 A1* | 3/2016 | Hamilton | H04L 67/26 713/168 |
| 2017/0244754 A1* | 8/2017 | Kinder | G06F 9/4406 |
| 2017/0324555 A1* | 11/2017 | Wu | H04L 63/0428 |
| 2018/0075536 A1* | 3/2018 | Jayaram | G06Q 20/26 |
| 2018/0091449 A1* | 3/2018 | Tellez | H04L 67/22 |
| 2018/0159886 A1* | 6/2018 | Gobel | G06F 21/50 |
| 2018/0357300 A1* | 12/2018 | Vadlamani | G06F 16/35 |
| 2019/0012218 A1* | 1/2019 | Rimac | G06F 9/546 |
| 2019/0014171 A1* | 1/2019 | Stein | G06F 9/542 |
| 2019/0044966 A1* | 2/2019 | Vega | G06F 9/45558 |
| 2019/0058772 A1* | 2/2019 | Ruiz-Meraz | H04L 67/26 |
| 2019/0095620 A1* | 3/2019 | Guri | H04L 67/12 |
| 2019/0104151 A1* | 4/2019 | Cheng | G06F 21/6218 |
| 2019/0188254 A1* | 6/2019 | Burns | G06Q 10/103 |
| 2019/0190929 A1* | 6/2019 | Thomas | H04L 63/20 |
| 2019/0289089 A1* | 9/2019 | Huang | H04W 4/021 |
| 2019/0325057 A1* | 10/2019 | Bensberg | G06F 9/542 |
| 2019/0342412 A1* | 11/2019 | Ruiz-Meraz | G06F 9/542 |
| 2019/0384912 A1* | 12/2019 | Branson | G06F 21/566 |
| 2020/0028863 A1* | 1/2020 | Wolfson | H04L 63/1441 |
| 2020/0042698 A1* | 2/2020 | Urias | G06F 9/545 |

\* cited by examiner

PARALLELIZED FORENSIC ANALYSIS USING CLOUD-BASED SERVERS

BACKGROUND

Digital forensic data analysis may include lengthy and costly processes in which data is prepared for analysis via data extraction tools. For example, data may be extracted in a serialized manner using manual tools. The extracted data may then be analyzed by an operator. In order to locate certain data, such as certain files or types of files, an operator may select a certain tool that may be used for certain data extraction or analysis, and then a different tool to process the extracted data. A series of tools or processes may therefore be used to reduce a size of data that is extracted. However, such processes may be inefficient and relatively expensive.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Forensic analysis of digital data may be a time consuming and manual intensive process, as certain operations may be performed in a serial nature. For example, data may be extracted from a disk image and then subsequently processed. Identification and execution of tools that may be used to process data may rely on manual input.

Embodiments of the disclosure include systems and methods for parallelized forensic analysis using cloud-based servers. Certain embodiments may streamline and/or optimize forensic processes in a modular and scalable format. Embodiments of the disclosure may be configured to couple or decouple various applications, services, and software components to process various data artifacts. Certain embodiments include a framework for standardizing digital forensic processes using protected area and software components, such as parsers, for data normalization. Software components may be plugged in for analysis in an on demand manner. Some embodiments include a server-less and/or event-driven pipeline that can be customized and deployed without physical dongles.

Certain embodiments may be dynamically scalable using automatic allocation of a certain amount of computing resources, where an amount of allocated computing resources may change in response to an amount of processing power needed to perform certain processing and/or forensic analysis. For example, when certain software components are processing data in parallel, an increased amount of computing resources may be allocated to the forensic analysis process and/or computer system, whereas if a single software component is processing data, a reduced amount of computing resources may be allocated.

This disclosure relates to, among other things, devices, systems, methods, computer-readable media, techniques, and methodologies for parallelized forensic analysis using cloud-based servers. Certain embodiments automatically process data that is input at one or more datastores in parallel, or at least partially concurrently, to determine a desired search result and/or until the extracted data is of a minimum size or is the smallest artifact that can be extracted. Some embodiments automatically identify a data type of data, and determine a set of software components that can process the data type using a subscription system. The output from the respective software components may be sent to the datastore for a subsequent iteration of the forensic process until the process is complete or a desired result is identified.

Figure 1:
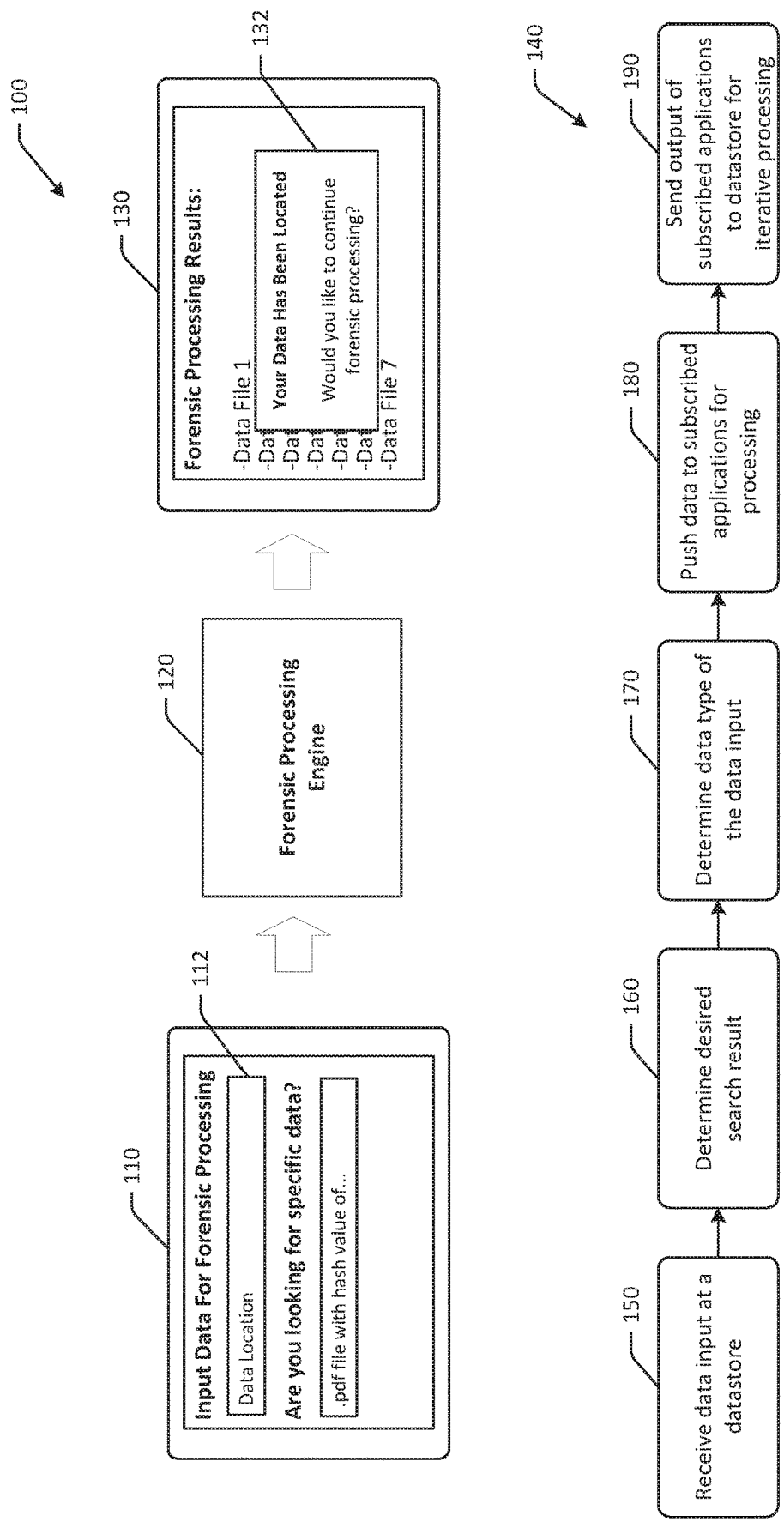
FIG. 1 is a schematic illustration of an example use case and process flow for parallelized forensic analysis using cloud-based servers in accordance with one or more example embodiments of the disclosure.

Referring to FIG. 1, an example use case 100 for parallelized forensic analysis using cloud-based servers is depicted in accordance with one or more example embodiments of the disclosure. In FIG. 1, a first user interface 110 may prompt a user to input data for forensic processing or analysis. A user may input a data location at user input 112, which may identify the location of the data that is to be processed. In some embodiments, the user may upload the data.

The first user interface 110 may include a query of whether the user is looking for specific data. For example, the user may be looking for certain text, certain applications, certain images, certain files, and so forth. The user may input a query of a ".pdf file with a hash value of . . . ," or a pdf having a certain hash value, such as a first hash value.

The inputs at the first user interface 110 may be sent to a forensic processing engine 120, which may be executed at a remote server. The forensic processing engine 120 may correspond, at least partially, to the system of FIGS. 3-4.

The forensic processing engine 120 may receive the inputs and may retrieve and process the data to determine a response to the search query and/or until the data is fully processed (e.g., broken down into the smallest fragments or artifacts possible, etc.).

At a second user interface 130, the results of the forensic processing by the forensic processing engine 120 may be presented. A notification 132 may be presented indicating that the desired search result has been satisfied and/or the requested data has been located. The user may opt to continue the forensic processing or to view the located file. In some embodiments, notifications may be presented using one or more messaging services (e.g., in connection with email, sms or text message, mobile push notifications, etc.), as well as an on-screen user interfaces. For example, during decomposition or during a search to satisfaction, a user may be notified of completion via a message sent to a user device.

Figure 6:
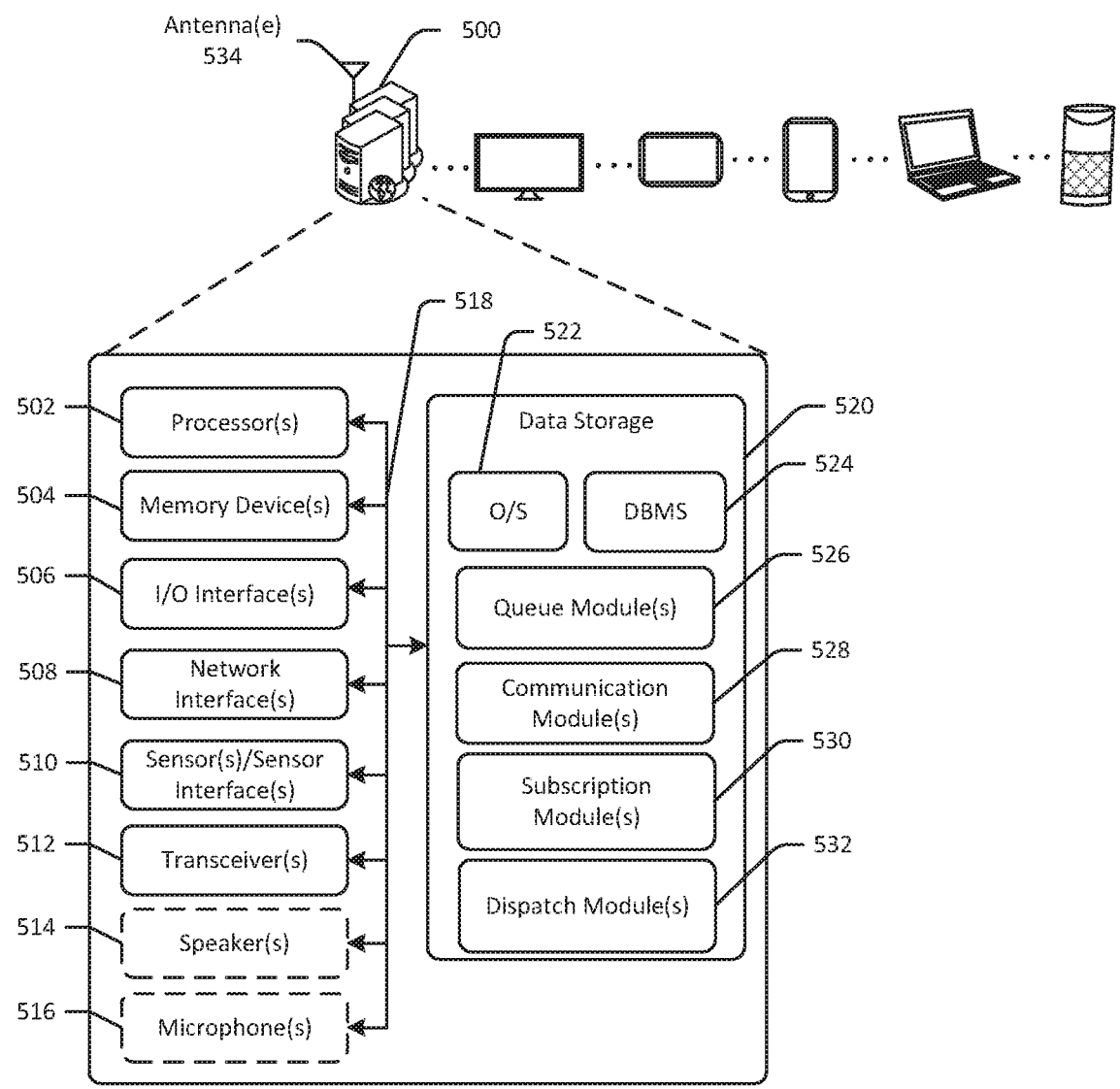
FIG. 6 is a schematic block diagram of an illustrative device in accordance with one or more example embodiments of the disclosure.

To perform forensic analysis using cloud-based servers in parallel, an example process flow 140 is presented and may be performed, for example, by one or more remote servers, such as that illustrated in FIG. 6.

At a first block 150, data input may be received at a datastore. For example, the remote server may be in communication with a datastore. The data input by the user may be stored in the datastore. For example, the user may input the location of the data at the first user input 112 of the first user interface 110, and the data may be retrieved and stored at the datastore.

At block 160, a desired search result may be determined. For example, the user may input a desired search result of a pdf file with a certain hash value at the first user interface 110. The remote server may receive the input and may determine the desired search result is the pdf file with the certain hash value. To determine the desired search result, a number of operations may be performed. For example, the datastore and/or one or more tables may receive the data input responsive to the user input at the first user interface 110. The data input may be a disk image including an email message file, and the email message file may include a pdf file as an attachment. A queue component of the forensic processing engine 120 may generate a first notification indicating that the data input has been received, and may store the first notification in a queue.

At block 170, the data type of the data input may be determined. For example, one or more modules at the remote server may be executed to determine the data type of the data that was input at the datastore. The remote server may determine the first data type by, for example, extracting and/or determining metadata associated with the data input. Metadata may include a file extension, data formatting information, data creation tool identification, programs associated with the data input, and/or other metadata. The data type or file type of the data input may indicate the type of data that was input, such as whether the data is a disk image data type, a data log file data type, a pdf file type, a specific application file type (e.g., email application, word processing application, web browsing application, etc.), a specific file format type, and other data types. In an example, a dispatch component of the forensic processing engine 120 may send a first request for the first notification to the queue or the queue component, and may receive the first notification. The dispatch component may determine, using the first notification, that a file type of the data input is a disk image file type, and may associate a file type label with the disk image that indicates that the file type of the disk image is the disk image file type. A first indication of the disk image file type may be stored in an evidence table.

At block 180, the data may be pushed to subscribed applications for processing. For example, the remote server may determine applications that are subscribed to notifications of data having the data type. For example, certain applications may be configured to process certain types of data, and may therefore be subscribed to notifications for data of the respective data types. The remote server may determine the applications that are subscribed to the notifications for the data type and may push the data and/or information associated with the data to the respective applications for processing. In another example, the applications that are subscribed to the notifications may pull or otherwise retrieve the data for processing. In the example of FIG. 1, a first application that extracts pdf files from disk images may be subscribed, and a second application that determines and/or compares hash valves may also be subscribed. The applications may therefore be used to satisfy the search query or input at the first user interface 110. In an example, the dispatch component may send the disk image and the file type label to a communication service. The communication service may include a set of software component subscribers that subscribe to respective notifications from the communication service. The set of software component subscribers may include a disk image extraction component that subscribes to notifications for disk image file types. The dispatch component and/or the communication service may determine that the disk image extraction component is subscribed to notifications for disk images, and may send the disk image to the disk image extraction component for extraction of files from the disk image. A set of extracted files may be determined by the forensic processing engine 120 as an output of the disk image extraction component. The set of extracted files may include the email message file. A second indication representing that file extraction of the disk image is complete may be stored in a task table.

At block 190, output of the subscribed applications may be sent to the datastore for iterative processing. For example, the remote server may determine outputs from the subscribed applications after the subscribed applications complete processing. The output may be sent back to the datastore as a new or subsequent data input for iterative processing. For example, a pdf file may first be extracted from a disk image, and then text may be extracted from the pdf file in a second iteration. The forensic processing engine 120 may send the set of extracted files to the datastore as a second input for iterative processing.

For example, a subsequent iteration may include a determination that an email message is an email message file type or data type. The email message file and/or a data type label may be sent to the communication service. The set of software component subscribers may include an email message extraction subscriber that subscribes to notifications for email message file types. The email message may be processed, and extracted data as an output of the email message extraction subscriber may include text associated with the email message file and the pdf file that was attached.

In some embodiments, the iterative process may be complete after a requested data file is located. For example, the forensic processing engine 120 may determine a search request indicative of data to be located in the data input (e.g., the pdf with a certain hash value, etc.), the forensic processing engine 120 may determine that the requested data is present in the set of extracted data, and forensic processing engine 120 may generate a search complete notification, such as the notification 132. For example, the forensic processing engine 120 may determine that a second hash value associated with a pdf file in the extracted data matches the hash value input by the user. In some embodiments, the iterative process may be complete after determining that the set of extracted data includes data of a minimum size.

Embodiments of the disclosure may include systems and methods to perform forensic analysis of data in parallel, and may include one or more modules that can be used to iteratively process data inputs using software components that may be executed in parallel and/or at least partially concurrently. Allocation of computing resources may also be dynamically adjusted responsive to computing needs of certain embodiments.

Typical forensic analysis tools form a single monolithic system that may not be decomposed by users into smaller operational components. In contrast, embodiments of the disclosure include systems and methods for building independent processing functions that, within each respective function, include executable logic for forensic processing. As a result, embodiments of the disclosure allow users to restructure a forensic analysis system and/or process to be flexible, scalable, and elastic. Certain embodiments separate the forensic logic context into individual components rather than one large contextually single-purpose system that may be found in typical forensic analysis tools.

Example embodiments of the disclosure provide a number of technical features or technical effects. For example, in accordance with example embodiments of the disclosure, certain embodiments of the disclosure may automatically extract data or files, record events or records, direct data to certain software components, invoke and/or execute certain software components, and determine responses to search queries. As a result of improved functionality, time spent preparing and/or processing data may be reduced, and manual effort may be reduced. Embodiments of the disclosure may improve computing efficiency and bandwidth by executing in parallel using subscribed applications or software components, thereby reducing unnecessary processing or invocation of irrelevant components. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
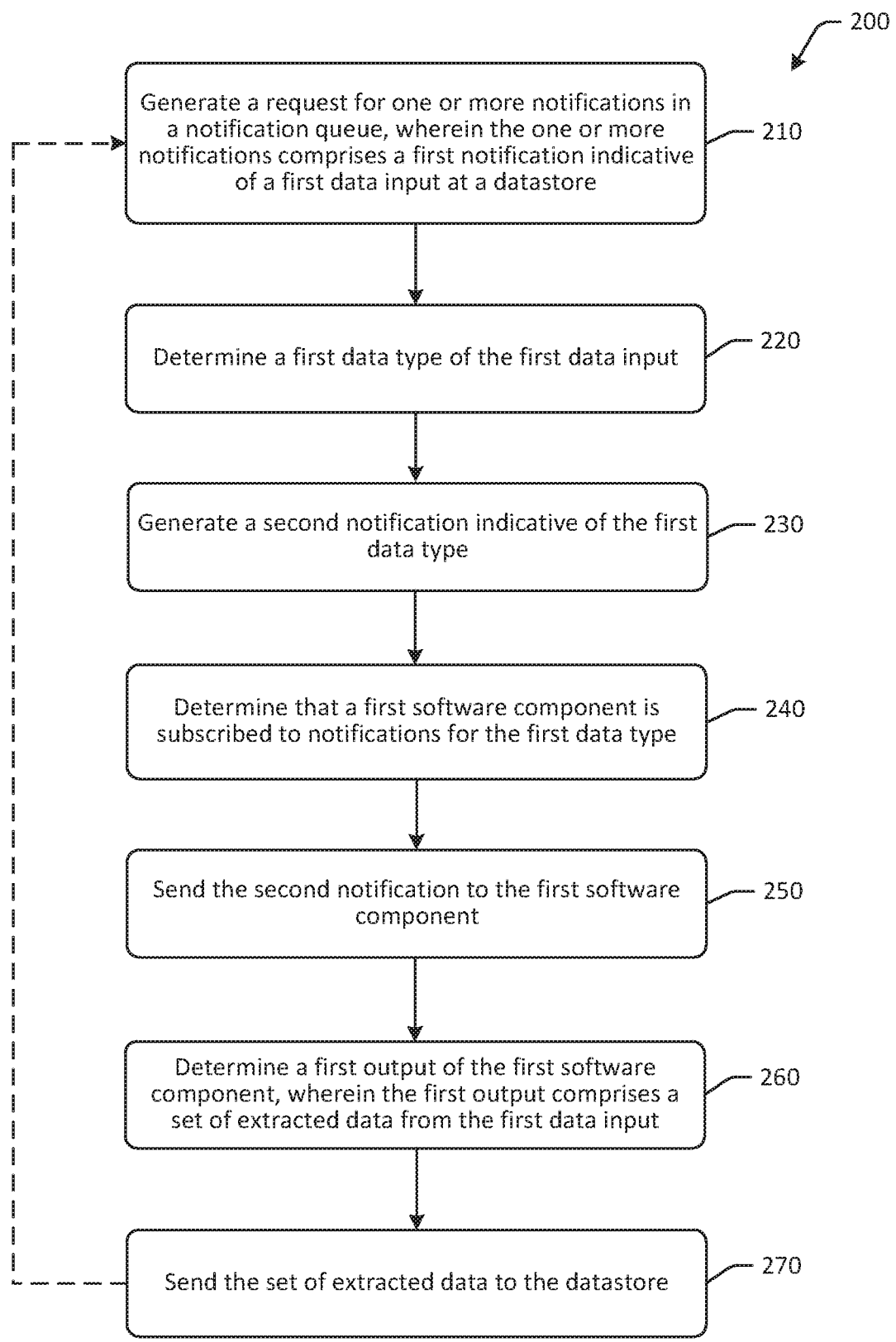
FIG. 2 is a schematic illustration of an example process flow for parallelized forensic analysis using cloud-based servers in accordance with one or more example embodiments of the disclosure.

FIG. 2 depicts an example process flow 200 for parallelized forensic analysis using cloud-based servers in accordance with one or more example embodiments of the disclosure. While example embodiments of the disclosure may be described in the context of data inputs and software components, it should be appreciated that the disclosure is more broadly applicable to any type of software application and/or program, and data may be retrieved by one or more systems or components. Some or all of the blocks of the process flows in this disclosure may be performed in a distributed manner across any number of devices. The operations of the process flow 200 may be optional and may be performed in a different order. The process flow 200 may be iteratively performed until, for example, a search query is satisfied, a smallest possible data artifact or data of a minimum size has been extracted, and so forth.

At block 210 of the process flow 200, computer-executable instructions stored on a memory of a device, such as a remote server or a user device, may be executed to generate a request for one or more notifications in a notification queue, wherein the one or more notifications comprises a first notification indicative of a first data input at a datastore. For example, a dispatch module at a remote server may be executed to generate a first request for one or more notifications in a notification queue. The one or more notifications may include a first notification indicative of a first data input at a datastore. The notifications may be generated, in one example, by a queue module responsive to data input at one or more datastores. For example, a user may input data, such as data logs, registry files, disk images, miscellaneous data, and so forth at one or more datastores. In another example, output of one or more software components, such as a parser component, may be input at the datastore, and may also trigger generation of a notification. The input and/or data may be detected, and a notification may be generated. The notification may indicate that data is present and/or available at the datastore. In some instances, the notification may include a location and/or identifier associated with the first data input. The notifications may be stored in a queue and may be arranged in a first in, first out arrangement, a chronological arrangement, or a different sorting arrangement. The dispatch module may generate and/or send a request for one or more notifications to the queue module, in one example. The queue module may receive the request and identify at least one notification of the one or more notifications in the queue to send to the dispatch module. In some embodiments, the queue module may be configured to function as a rate limiting component, so as to prevent overloading the dispatch module.

At block 220 of the process flow 200, computer-executable instructions stored on a memory of a device, such as the remote server, may be executed to determine a first data type of the first data input. For example, a dispatch module at the remote server may determine a first data type of the first data input. The dispatch module may determine the first data type by, for example, extracting and/or determining metadata associated with the first data input. Metadata may include a file extension, data formatting information, data creation tool identification, programs associated with the data input, and/or other metadata. The data type or file type of the data input may indicate the type of data that was input, such as whether the data is a disk image data type, a data log file data type, a pdf file type, a specific application file type (e.g., email application, word processing application, web browsing application, etc.), a specific file format type, and other data types. The file type may include information related to a size of the data input. For example, the amount of data used by the data input (e.g., 4 gigabytes, 2 megabytes, etc.) may be determined. The size of the data input may be used to determine whether further data processing, such as extraction, is possible for the particular data type. In some instances, data related to the size of the data input may be determined by the queue module and/or the dispatch module, and may be associated with the data input. In some embodiments, the dispatch module may retrieve the data that was input from the datastore to determine the data type.

At block 230 of the process flow 200, computer-executable instructions stored on a memory of a device may be executed to generate a second notification indicative of the first data type. For example, a dispatch module at the remote server may generate a second notification indicative of the first data type. The second notification may include an indication of the data type of the first data input, and may optionally include the data. In some embodiments, the second notification may be a data tag or label that is associated with the data. The data tag may indicate the data type of the data. The second notification may be pushed and/or sent to (and optionally stored) to a communication service. The communication service may include a subscription module or component that manages subscriptions by software components, such as data extraction components, parsing components, processing components, and the like. The software components may be operated by third parties and/or natively and may be executed on different computer systems. The software components may be subscribed to various notifications, such as notifications of certain data types.

At block 240, computer-executable instructions stored on a memory of a device may be executed to determine that a first software component is subscribed to notifications for the first data type. For example, the communication service at the remote server may determine that a first software component, which may be a software application, is subscribed to notifications for the first data type. The second notification may correspond to the first data type, and the first software component may therefore be subscribed to the second notification. In an example, the first software component may be a disk image file extraction component, and the first data type may be a disk image data type. Accordingly, the disk image file extraction component may be configured to process the first data because it may be a disk image data type. Processing may include, for example, file extraction, searching, copying, mounting, etc.

At block 250, computer-executable instructions stored on a memory of a device may be executed to send the second notification to the first software component. For example, the communication service at the remote server may send and/or push the second notification to the first software component. The first software component may subsequently receive (and/or retrieve) the data input and the notification, and may process the data accordingly. In some instances, multiple software components may be subscribed to notifications, such as notifications of a particular data type, and some or all of the subscribed software components may receive the notifications to which they are subscribed. In such instances, the respective software components may process copies of the data in parallel, so as to reduce overall processing time.

At block 260, computer-executable instructions stored on a memory of a device may be executed to determine a first output of the first software component, wherein the first output comprises a set of extracted data from the first data input. For example, the first software component, which may be a data extraction component, may process the data by extracting data, such as files, from a disk image, and may output a set of extracted data. The remote server may determine that processing of the first data input by the first software component is complete, and may determine the first output of the first software component.

At block 270, computer-executable instructions stored on a memory of a device may be executed to send the set of extracted data to the datastore. For example, the remote server may determine that the first output is available and/or that processing by the first software component is complete, and may cause the first output to be stored at the datastore as a new or subsequent data input. For example, the set of extracted data may be sent to and/or stored at the datastore. In some embodiments, the set of extracted data may be sent to and/or stored at the datastore by a different computer system (e.g., if the first software component does not reside or execute on the remote server, etc.). Data output of multiple data processing software components may be sent to the datastore for storage as the respective software components complete processing, in instances where more than one software component processes the data input.

The process flow 200 may then optionally return to block 210, where the first output may be a second data input at the datastore. The process flow 200 may therefore be performed in an iterative manner as needed to satisfy a user request and/or until no further processing of the extracted data can be completed.

Accordingly, using the process flow 200, forensic analysis of data inputs may be performed in an iterative manner and in parallel until data artifacts of a minimum size are extracted from the data input and/or until a desired data component is identified. In some embodiments, the process flow 200 may be automatically performed in an iterative process by, for example, a remote server.

Figure 3:
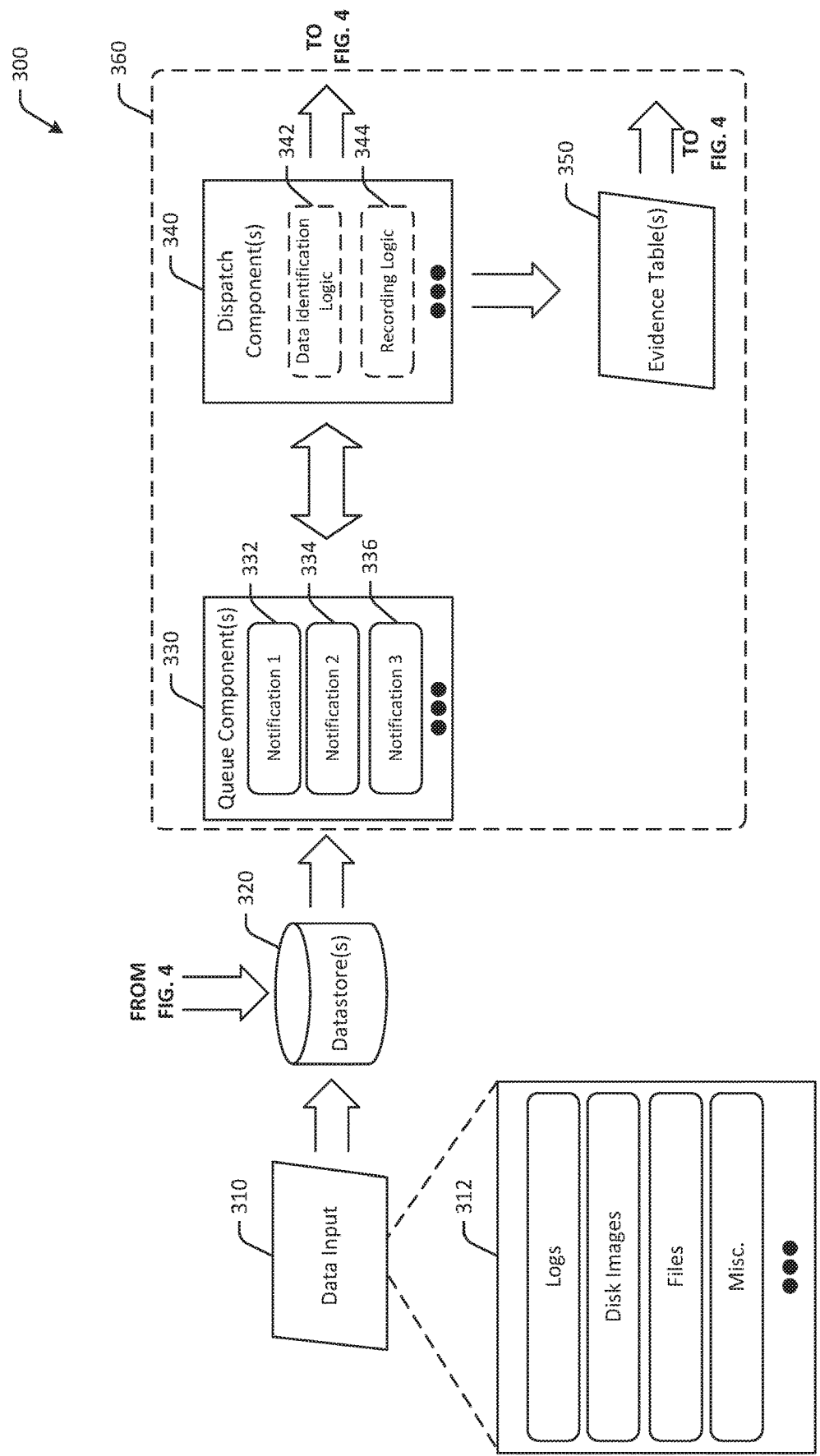
FIGS. 3-4 are schematic illustrations of an example system for parallelized forensic analysis using cloud-based servers in accordance with one or more example embodiments of the disclosure.
Figure 4:
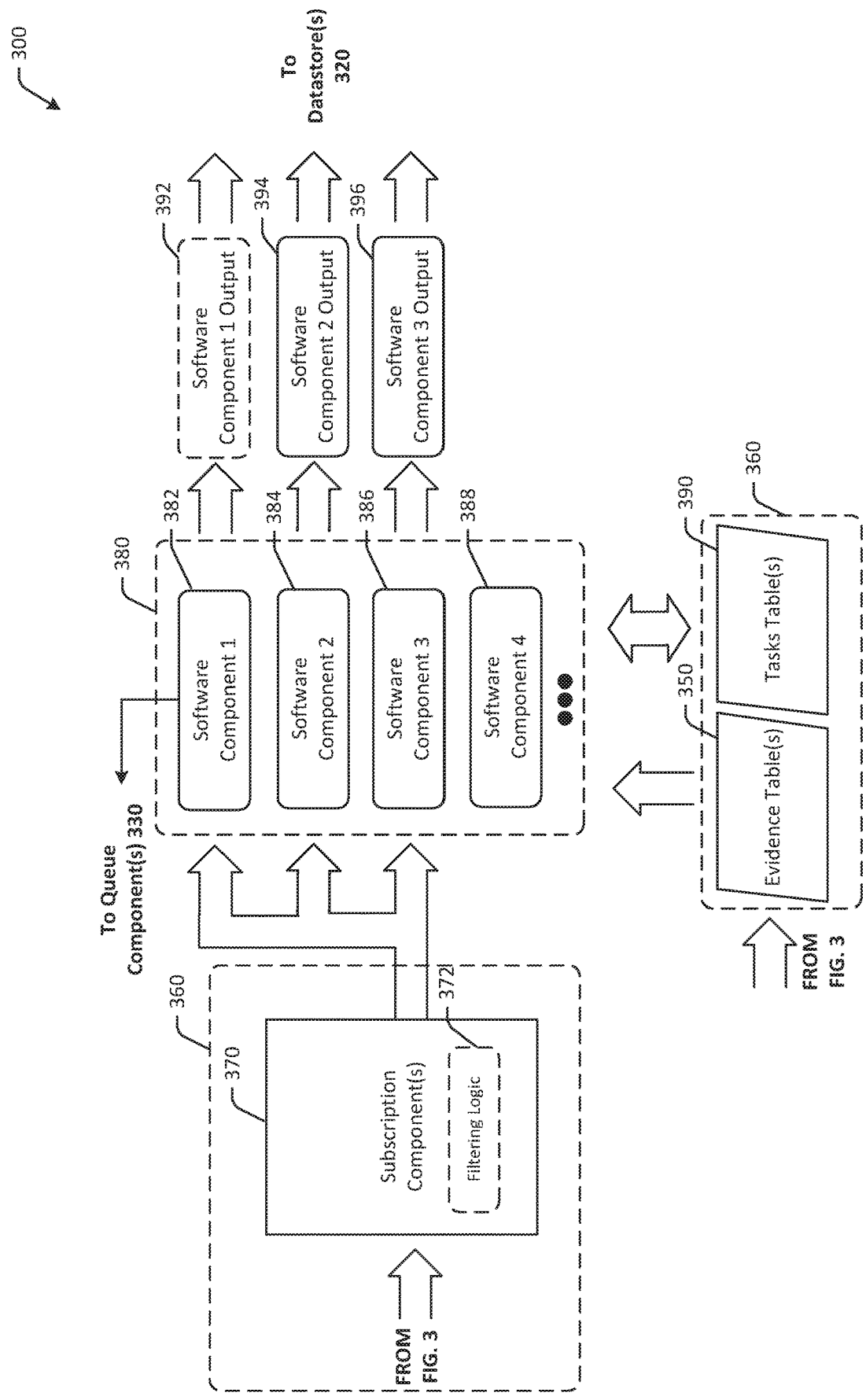

FIGS. 3-4 are schematic illustrations of an example system 300 for parallelized forensic analysis using cloud-based servers in accordance with one or more example embodiments of the disclosure. Different embodiments may include different, additional, or fewer components, inputs, and/or outputs than those illustrated in the example of FIGS. 3-4.

In FIG. 3, an example hybrid system and data flow is schematically depicted. Initial data 310 may be input at one or more datastores 320. For example, initial data input may include data logs, disk images, data files, miscellaneous data, and/or other data. The initial data may be input by a user or may be retrieved by the system 300. In some instances, the user may input a search query or other indication of a desired outcome of the forensic analysis performed by the system 300. For example, the user may input a request to locate data and/or a search query of a certain string of characters, a certain file, presence of a certain computer program, and/or other inputs. The datastore 320 may be associated with a particular forensic case and may store some or all evidence related to the particular forensic case.

The datastore 320 may receive the initial data input 310 and may store the data. In some embodiments, the system 300 may automatically initiate certain actions, such as mounting a disk image, after the initial data input 310. In another example, the system 300 may automatically select a process from a set of available processes for processing the first input 310. The process may be selected from available options of, for example, extracting data for individual artifacts, determining a user request and selecting a process based on the user's request, etc. The datastore 320 may also receive inputs from and/or store data that is output by one or more software components, illustrated in FIG. 3 as "from FIG. 4," and discussed with respect to FIG. 4. For example, output from a software component may include extracted data files. The extracted data files may be sent to and/or stored by the datastore 320, and may be reprocessed by the system 300, for example, to further extract data. In one example, a pdf file may be extracted by a software component, sent to the datastore 320, and then reprocessed by the system 300 to extract text and/or images from the pdf file. The datastore 320 may be automatically expandable in size and may not be subject to size restraints in some embodiments.

The datastore 320 may be in communication with one or more queue modules (e.g., queue module 526 in FIG. 6, etc.) or queue components 330. The queue component 330 may be executed on a server in one example. The queue component 330 may be configured to generate a notification when data is input and/or stored at the datastore 320. For example, the queue component 330 may receive an indication from the datastore 320 when data is input at the datastore 320. For some of all data elements input at the datastore 320, the queue component 330 may generate a notification. The notification may include information associated with the data input, such as a time of input, a filename, a file size, a data location, a data identifier, and/or other information. The notification may include structured metadata, such as timestamps, geospatial data, signatures, identifiers, etc. The queue component 330 may serve to decouple one or more processes.

The notifications generated by the queue component 330 may be stored by the queue component in various arrangements. For example, the notifications may be stored in a first in, first out arrangement, a chronological arrangement, a size-based sorting arrangement, a data type arrangement, and/or another arrangement. In the example of FIG. 3, a first notification 332 indicative of the data input 310, a second notification 334, and a third notification 336 may be generated and/or stored in a queue by the queue component 330. The notifications may serve to track data that is input at the datastore for forensic processing. In some embodiments, notifications may be generated responsive to object creation indications as data is input at the datastore 320.

The queue component 330 may be in communication with one or more dispatch modules (e.g., dispatch module 532 of FIG. 6, etc.) and/or dispatch components 340. The dispatch component 340 may include optional data identification logic 342 and optional recording logic 344. The dispatch component 340 may be configured to identify and/or determine a data type of data that is input at the datastore 320, and to coordinate processing by one or more software components, as discussed with respect to FIG. 4. The dispatch component 340 may be configured to poll the queue component 330 for notifications. For example, the dispatch component 340 may send a request for one or more notifications to the queue component 330. The dispatch component 340 may periodically poll the queue component 330, or may poll the queue component 340 responsive to one or triggers, such as completion of certain tasks.

The queue component 330 may receive the request from the dispatch component 340. The queue component 330 may determine a number of notifications to send to the dispatch component 340 in response to the request. In some instances, the queue component 330 may be configured to rate-limit the system 300. For example, there may be 100 notifications in the queue at the queue component 330, but the queue component 330 may be configured to send no more than a certain number, such as 10 notifications, to the dispatch component 340 at a time and/or responsive to a request. In another example, the queue component 330 may determine that a first number of notifications in the queue meets a rate limiting threshold (e.g., the rate limiting threshold may be the maximum number of notifications that can be sent to (or retrieved by) the dispatch component 340 at a time or within a time period, etc.). The queue component 330 may determine a second number of notifications, such as a number less than the rate limiting threshold, in the queue to include in a response to the request. The queue component 330 may therefore be configured to prevent a system crash or overload. The queue component 330 may select notifications to send to the dispatch function 340 based at least in part on a setting or arrangement, such as a first in, first out, etc.

The dispatch component 340 may receive and/or retrieve the notification(s) from the queue or queue component, and may use the data identification logic 342 to determine a data type of the data input 310 at the datastore 320. In some embodiments, the data type may be identified or determined by the dispatch component 340 using information associated with the data that was input, the notification, implementing one or more processes, and/or other data identification means. In some embodiments, the dispatch component 340 may generate a data tag or label indicative of the first data type for association with the first data input. The data tag may be associated with the data input as metadata.

The dispatch component 340 may be in communication with one or more evidence tables 350. The evidence table 350 may be a data log and/or data table that is configured to receive write inputs from the dispatch component 340, and to store the inputs in a data log and/or data table. For example, the dispatch function 340 may, using the recording logic 344, write a data entry or record indicative of the data type of the data input 310 at the evidence table 350. The recording logic 344 may be used to determine data to send to or write to the evidence table 350. In some embodiments, the dispatch component 340 may have write access to the evidence table 350, while other components may not have access or may have read-only access to the evidence table 350. The evidence table 350 may be a state table and may be stored at a database. The evidence table 350 may be read, in one example, by one or more software components to, for example, determine a data type of certain data, determine an identifier associated with certain data, determine a data location, determine a task that is to be performed, and/or other information.

As illustrated in FIG. 4, the dispatch component 340 may be in communication with one or more subscription components 370. The subscription component 370 may be a communication service and/or may correspond to a subscription module 530 illustrated in FIG. 6. The subscription component 370 may include optional filtering logic 372. The evidence table 350 reappears in FIG. 4 to illustrate that the evidence table 350 may be in communication with a set of software components 380 that may, in one example, have read-only access to the evidence table 350.

The subscription component 370 may be in communication with a set of software components 380. In some embodiments, the subscription component 370 and the set of software components 380 may form a communication service, while in other embodiments, the subscription component 370 may form the communication service.

The subscription component 370 may be configured to coordinate and manage the delivery or sending of messages or notifications to subscribing endpoints, such as software components. The dispatch component 340 may communicate asynchronously with subscribed software components by producing and sending messages or notifications to the subscription component 370, which may function as a logical access point and communication channel. Subscribers consume or receive the message or notification when they are subscribed. Instead of including a specific destination address in each message or notification, the dispatch component 340 may send a message or notification to a group, and the subscription component 370 may match the group to a list of subscribers who have subscribed to that group, and delivers the message to some or each of the subscribers.

The set of software components 380 may include one or more software components, which may be applications, portions of code, processes, or other computer-executable functions, that may be configured to perform certain tasks. For example, a first software component 382 may be configured to extract email messages from an email application or disk image, a second software component 384 may be configured to extract images from email messages, a third software component 386 may be configured to extract text from images, a fourth software component 388 may be configured to calculate and compare hash values of documents, and so forth. Any number of software components may be included in the set of software components 380. The software components may be configured to operate in parallel, in some instances using more than one copy of data, so as to reduce processing time.

Some of the software components may be hosted locally at a server, while others may be hosted remotely and/or executed using different computer systems, such as third party computer systems. For example, in FIG. 4, the first software component 382 may be a native software component, or may be trusted, or may be executed and/or hosted locally at the system 300. As a result, output of the first software component 382 may be trusted, and may be sent directly to the queue component 330 (indicated by the arrow in FIG. 4), so as to bypass storage and/or processing at the datastore 320. The first software component 382 may therefore have privileged access to update the queue component 330.

The software components of the set of software components 380 may be subscribed to certain notifications. For example, the first software component 382 may be subscribed to notifications of data having a disk image data type, the second software component 384 may be subscribed to notifications of email message data types, or notifications of requests to locate or search for certain email content, and so forth. In some instances, there may be one notification feed that includes additions of artifacts of all types, and the set of software components 380 can selectively consume notifications (thereby taking ownership of the job of processing that particular artifact).

Subscriptions to notifications may be managed by the subscription component 370. For example, the subscription component 370 may receive notifications from the dispatch component 340 indicative of a data type or search request, and may push the notifications to the software components that are subscribed to such notifications.

To add or remote software components from subscriptions, the subscription component 370 may determine a functionality associated with a software component. For example, the subscription component 370 may determine that a software component is configured to process certain data types using information related to compatible data types for the software component. The subscription component 370 may determine, using the functionality, that the software component is to be subscribed to the notifications for a data type corresponding to the compatible data types, and the subscription component 370 may assign or associate the software component to the notifications, such that the software component is invoked when data of the compatible data type is input at the datastore.

In an example, the dispatch component 340 may send or push data tags to the subscription component 370. In some embodiments, the data tags may be retrieved or puled by the subscription component 370. The data tags may be sent or pushed in the form of a notification. For example, the dispatch component 340 may generate a data tag indicating that the data input 310 has a disk image data type, and may push a notification of the data tag, or the data tag itself, to the subscription component 370.

The subscription component 370 may receive the notification from the queue component 340 and determine, using the filtering logic 372, the software subscribers that are subscribed to such notifications. For example, the subscription component 370 may determine that the first software component 382 is subscribed to notifications of disk image data types. The subscription component 370 may send or push the notification and/or the data input or an indication of the location of the data input to the first software component 382. In another example, the first software component 382 may pull or otherwise retrieve the data for processing.

The first software component 382 may receive the notification and/or data tag, and may retrieve the data for processing. In some embodiments, the data may be received from the dispatch component 340 and/or subscription component 370, while in other embodiments the data may be retrieved from the datastore 320. The first software component 382 may perform its designated process (e.g., file extraction, etc.), and may generate a first output 392. In some embodiments, an indication of the first output 392 may be sent directly to the queue component 330. The first output 392 may optionally be sent to the datastore 320 as a new data input, and the process may be iteratively performed. The output of the respective software components may be sent to the datastore and/or to user tooling for further processing or completion of the process.

While the first software component 382 is processing data, the other software components may perform tasks or process data in parallel in some instances. For example, as email messages are extracted by the first software component 382, the second software component 384 may extract images from the email messages. The second software component 384 may generate second output 394, which may be at least partially during operation of the first software component 392. The second output 394 may be sent to the datastore 320 as a new data input. Similarly, the third software component 386 may generate third output 396, which may be sent to or stored at the datastore 320.

In the example of FIG. 4, the first software component 382, the second software component 384, and the third software component 386 may be subscribed to the notification, while the fourth software component 388 may not be subscribed to the notification. Accordingly, the fourth software component 388 may not be used and may therefore not generate an output.

The amount of computing resources allocated to the system 300 and/or the set of software components 380 may be dynamically scalable. For example, depending on a number of software components that are actively processing data, or an amount of processing consumed by the active software components, allocated computing resources may be increased or decreased. The allocation of computing resources may include reallocation of cloud computing resources from other processes to the forensic analysis process, the allocation of unused cloud computing resources, and/or a combination thereof. The amount of allocated computing resources may change over time as the forensic processing progresses and/or as software components complete processing. For example, when certain software components are processing data in parallel, an increased amount of computing resources may be allocated to the forensic analysis process and/or computer system, and upon completion of processing, a reduced amount of computing resources may be allocated. In another example, the system 300 may determine a first amount of computing resources to allocate during processing by a plurality of software components, and may determine a second amount of computing resources to allocate during processing by less than a plurality of the software components (e.g., as some of the software components finish processing, etc.), where the second amount is less than the first amount. In this manner, the system 300 may achieve optimal performance and scalability with automatic and dynamic allocation of computing resources.

As tasks are completed by the respective software components in the set of software components 380, the software components may communicate with the tasks table 390. The tasks table 390 may serve to track tasks that were performed by various software components and outcomes that were generated. The tasks table 390 may be a data log and/or data table that is configured to receive write inputs from the software components, and to store the inputs in a data log and/or data table. For example, the first software component 382 may write a data entry indicating that the task of file extraction was performed and completed on a disk image, and the results were sent to the datastore and/or queue component. The software components may be read/write access to the tasks table 390, which may allow for avoidance of duplicate or parallel completion of the same task.

The tasks table 390 and the evidence table 350 may serve as a guide to achieve repeatable results. The tasks table 390 and the evidence table 350 may provide detail with regard to all actions that were completed during forensic processing, and may serve as a digital chain-of-custody in some instances.

The queue component 330, the dispatch component 340, the subscription component 370, the evidence table 350, and the tasks table 390 may be executed in a protected space 360 of the system 300. For example, the protected space 360 may be accessed by software components that are associated with a certain level of permissions or access.

Figure 5:
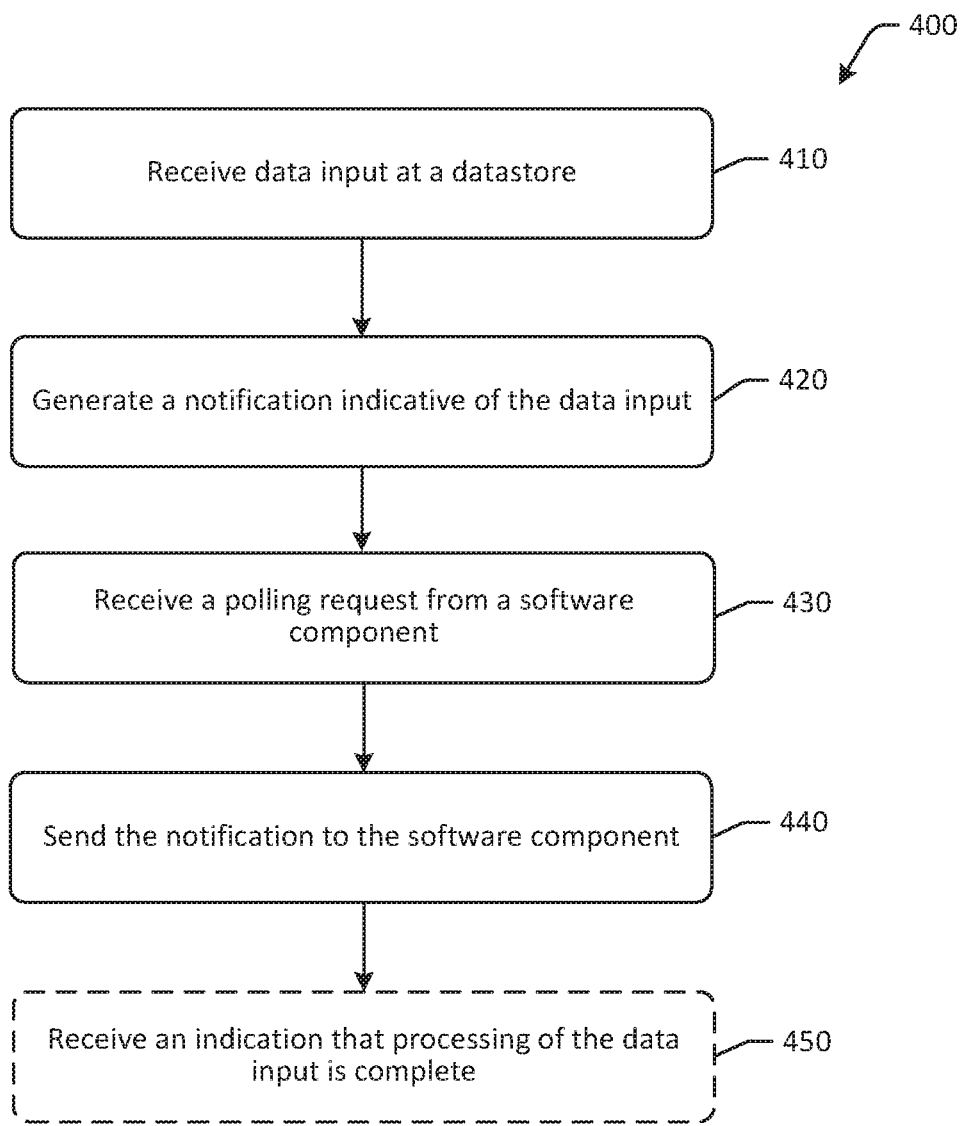
FIG. 5 is a schematic illustration of an example process flow for data intake at a system for parallelized forensic analysis using cloud-based servers in accordance with one or more example embodiments of the disclosure.

FIG. 5 depicts an example process flow 400 for data intake at a system for parallelized forensic analysis using cloud-based servers in accordance with one or more example embodiments of the disclosure. While example embodiments of the disclosure may be described in the context of data inputs and software components, it should be appreciated that the disclosure is more broadly applicable to any type of software application and/or program, and data may be retrieved by one or more systems or components. Some or all of the blocks of the process flows in this disclosure may be performed in a distributed manner across any number of devices. The operations of the process flow 400 may be optional and may be performed in a different order. The process flow 400 may be iteratively performed until, for example, a search query is satisfied, a smallest possible data artifact or data of a minimum size has been extracted, and so forth.

At block 410 of the process flow 400, computer-executable instructions stored on a memory of a device, such as a remote server or a user device, may be executed to receive data input at a datastore. For example, a remote server may receive (e.g., from another computer system or service provider, etc.) data at a datastore. The data may be designated for forensic analysis. In some embodiments, the data may be input by a user, while in other embodiments, data may automatically be retrieved. The data may be extracted data that has been extracted from a previously input data file. For example, the data may include images from a disk image that was previously input at the system (e.g., the process may continue iteratively, with subsequently smaller files being processed, etc.). The datastore may be in communication with the remote server.

At block 420 of the process flow 400, computer-executable instructions stored on a memory of a device, such as the remote server, may be executed to generate a notification and/or message indicative of the data input. For example, one or more module(s), such as a queue module, at the remote server may be executed to determine that data was input at the datastore. The module(s) may therefore generate a notification that indicates the presence of the data that was input. For example, the notification may indicate that data of a particular size and/or structure is available at the datastore.

In some embodiments, notifications may be generated for each data file that is available at the datastore. Accordingly, a queue of notifications may be generated and used to notify a different computer system and/or component of the data that is available at the datastore. The queue may be in chronological order. Notifications and/or messages in the queue may be sent to other computer systems and/or services on a first in, first out basis, in the order in which the messages or notifications were generated, or in another suitable order.

At block 430 of the process flow 400, computer-executable instructions stored on a memory of a device, such as the remote server, may be executed to receive a polling request from a software component. For example, a software component, such as a dispatch component, may generate a polling request indicative of a request for updated and/or new notifications. The polling request may be received, for example, by a queue component of the remote server. The queue component may determine whether any new or updated notifications are available. The notifications may be generated by the queue component as a result of data inputs at one or more datastores. The notifications may include data identifiers associated with the respective data input at the datastore. Polling requests may be sent by the software component periodically, at certain intervals, or based at least in part on one or more triggers, such as a trigger of new data input at a datastore.

At block 440 of the process flow 400, computer-executable instructions stored on a memory of a device, such as the remote server, may be executed to send the notification to the software component. For example, the queue component may determine that the notification is new or was otherwise unavailable at a time of a last received polling request, or that the notification was not previously sent to the software component, and may send the notification to the software component. In some embodiments, the software component may be executed at the remote server, while in other embodiments, the software component may be executed at a different computer system.

At optional block 450 of the process flow 400, computer-executable instructions stored on a memory of a device, such as the remote server, may be executed to receive an indication that processing of the data input is complete. For example, after data extraction processes resulting in the smallest possible data artifact are complete, a notification may be generated indicating that processing of the data input is complete. In another example, after a desired data component, such as a data component identified in a search query, has been located, processing of data input may be complete, and a notification indicating that data processing is complete may be generated. In some embodiments, completion may be indicated by no activity in a task table for a given period of time.

Accordingly, using the process flow 400, forensic analysis of data inputs may be performed in an iterative manner until data artifacts of a minimum size are extracted from the data input and/or until a desired data component is identified. In some embodiments, the process flow 400 may be automatically performed in an iterative process by, for example, a remote server.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

FIG. 6 is a schematic block diagram of an illustrative remote server 500 in accordance with one or more example embodiments of the disclosure. The remote server 500 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The remote server 500 may correspond to an illustrative device configuration for the devices of FIGS. 1-5.

The remote server 500 may be configured to communicate via one or more networks with one or more servers, search engines, user devices, and/or other devices. In some embodiments, a single remote server or single group of remote servers may be configured to perform more than one type of forensic analysis and/or may include one or more components of a forensic analysis engine or system.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 500 may include one or more processors (processor(s)) 502, one or more memory devices 504 (generically referred to herein as memory 504), one or more input/output (I/O) interface(s) 506, one or more network interface(s) 508, one or more sensors or sensor interface(s) 510, one or more transceivers 512, one or more optional speakers 514, one or more optional microphones 516, and data storage 520. The remote server 500 may further include one or more buses 518 that functionally couple various components of the remote server 500. The remote server 500 may further include one or more antenna(e) 534 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 518 may include at least one of a system bus, a memory bus, an address bus, or a message bus, and may permit exchange of information (e.g., data (including computer-executable code), signaling, etc.) between various components of the remote server 500. The bus(es) 518 may include, without limitation, a memory bus or a memory controller, a peripheral bus, an accelerated graphics port, and so forth. The bus(es) 518 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the remote server 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 520 may include removable storage and/or non-removable storage including, but not limited to, magnetic storage, optical disk storage, and/or tape storage. The data storage 520 may provide non-volatile storage of computer-executable instructions and other data. The memory 504 and the data storage 520, removable and/or non-removable, are examples of computer-readable storage media (CRSM) as that term is used herein.

The data storage 520 may store computer-executable code, instructions, or the like that may be loadable into the memory 504 and executable by the processor(s) 502 to cause the processor(s) 502 to perform or initiate various operations. The data storage 520 may additionally store data that may be copied to memory 504 for use by the processor(s) 502 during the execution of the computer-executable instructions. Moreover, output data generated as a result of execution of the computer-executable instructions by the processor(s) 502 may be stored initially in memory 504, and may ultimately be copied to data storage 520 for non-volatile storage.

More specifically, the data storage 520 may store one or more operating systems (O/S) 522; one or more database management systems (DBMS) 524; and one or more program module(s), applications, engines, computer-executable code, scripts, or the like such as, for example, one or more queue module(s) 526, one or more communication module(s) 528, one or more subscription module(s) 530, and/or one or more dispatch module(s) 532. Some or all of these module(s) may be sub-module(s). Any of the components depicted as being stored in data storage 520 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 520 may support functionality described in reference to correspondingly named components earlier in this disclosure.

The data storage 520 may further store various types of data utilized by components of the remote server 500. Any data stored in the data storage 520 may be loaded into the memory 504 for use by the processor(s) 502 in executing computer-executable code. In addition, any data depicted as being stored in the data storage 520 may potentially be stored in one or more datastore(s) and may be accessed via the DBMS 524 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, data input for forensic analysis, data entered or dropped off by users, user account information, user profile information, machine learning models, historical accuracy data, and other information.

The processor(s) 502 may be configured to access the memory 504 and execute computer-executable instructions loaded therein. For example, the processor(s) 502 may be configured to execute computer-executable instructions of the various program module(s), applications, engines, or the like of the remote server 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 6, the queue module(s) 526 may include computer-executable instructions, code, or the like that responsive to execution by one or more of the processor(s) 502 may perform functions including, but not limited to, determining that data has been input at a datastore or other repository, determining a data type, determining desired search results, determining search queries, generating notifications, sending notifications and/or data that has been input at a datastore, and the like.

The communication module(s) 528 may include computer-executable instructions, code, or the like that responsive to execution by one or more of the processor(s) 502 may perform functions including, but not limited to, communicating with one or more devices, for example, via wired or wireless communication, communicating with software components and/or applications, communicating with remote datastores, sending or receiving notifications or alerts, communicating with cache memory data, and the like.

The subscription module(s) 530 may include computer-executable instructions, code, or the like that responsive to execution by one or more of the processor(s) 502 may perform functions including, but not limited to, determining software components that are subscribed to particular services, data types, and/or notifications, determining that a software component is to be added to or removed from a subscription, assigning a software component to a subscription type, sending and receiving data, communicating with software components and/or services, and the like.

The dispatch module(s) 532 may include computer-executable instructions, code, or the like that responsive to execution by one or more of the processor(s) 502 may perform functions including, but not limited to, polling the queue module(s) 526, sending and receiving data, identifying data types, generating data tags and/or labels, sending requests, recording events and/or tasks at a table, and the like.

Referring now to other illustrative components depicted as being stored in the data storage 520, the O/S 522 may be loaded from the data storage 520 into the memory 504 and may provide an interface between other application software executing on the remote server 500 and hardware resources of the remote server 500. More specifically, the O/S 522 may include a set of computer-executable instructions for managing hardware resources of the remote server 500 and for providing common services to other application programs (e.g., managing memory allocation among various application programs). The O/S 522 may include any operating system now known or which may be developed in the future including, but not limited to, any server operating system, any mainframe operating system, or any other proprietary or non-proprietary operating system.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (e.g., relational model, object model, etc.) and may support any of a variety of query languages. The DBMS 524 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 500 is a mobile device, the DBMS 524 may be any suitable light-weight DBMS optimized for performance on a mobile device.

Referring now to other illustrative components of the remote server 500, the input/output (I/O) interface(s) 506 may facilitate the receipt of input information by the remote server 500 from one or more I/O devices as well as the output of information from the remote server 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 534 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 500 may further include one or more network interface(s) 508 via which the remote server 500 may communicate with any of a variety of other systems, platforms, networks, devices, and so forth. The network interface(s) 508 may enable communication, for example, with one or more wireless routers, one or more host servers, one or more web servers, and the like via one or more of networks.

The antenna(e) 534 may include any suitable type of antenna depending, for example, on the communications protocols used to transmit or receive signals via the antenna (e) 534. Non-limiting examples of suitable antennas may include directional antennas, non-directional antennas, dipole antennas, folded dipole antennas, patch antennas, multiple-input multiple-output (MIMO) antennas, or the like. The antenna(e) 534 may be communicatively coupled to one or more transceivers 512 or radio components to which or from which signals may be transmitted or received.

As previously described, the antenna(e) 534 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 534 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 534 may be configured to transmit or receive radio frequency signals within any suitable frequency range forming part of the unlicensed portion of the radio spectrum.

The antenna(e) 534 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 534—transmitting or receiving radio frequency (RF) signals in the bandwidth and/or channels corresponding to the communications protocols utilized by the remote server 500 to communicate with other devices. The transceiver(s) 512 may include hardware, software, and/or firmware for modulating, transmitting, or receiving—potentially in cooperation with any of antenna(e) 534—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the remote server 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 514 may be any device configured to generate audible sound. The optional microphone(s) 516 may be any device configured to receive analog sound input or voice data.

It should be appreciated that the program module(s), applications, computer-executable instructions, code, or the like depicted in FIG. 6 as being stored in the data storage 520 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 500, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the remote server 500 may include alternate and/or additional hardware, software, or firmware components beyond those described or depicted without departing from the scope of the disclosure. More particularly, it should be appreciated that software, firmware, or hardware components depicted as forming part of the remote server 500 are merely illustrative and that some components may not be present or additional components may be provided in various embodiments. While various illustrative program module(s) have been depicted and described as software module(s) stored in data storage 520, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by one or more computer processors coupled to memory, a first input at a datastore of a disk image comprising an email message file, wherein the email message file comprises a pdf file as an attachment;
generating a first notification indicating that the first input has been received;
storing the first notification in a queue;
sending a first request for the first notification to the queue;
receiving the first notification;
determining, using the first notification, that a file type of the first input is a disk image file type;
associating a file type label with the disk image, wherein the file type label indicates that the file type of the disk image is the disk image file type;
storing a first indication of the disk image file type in an evidence table;
sending the disk image and the file type label to a communication service, wherein the communication service comprises a set of software component subscribers that subscribe to respective notifications from the communication service, and wherein the set of software component subscribers comprises a disk image extraction component that subscribes to notifications for disk image file types;
determining that the disk image extraction component is subscribed to notifications for disk images;
sending the disk image to the disk image extraction component for extraction of files from the disk image;
determining a first amount of computing resources to allocate to the disk image extraction component during processing of the first input by the disk image extraction component;
determining a set of extracted files as an output of the disk image extraction component as a result of the disk image extraction component processing the first input using the allocated first amount of computing resources, wherein the set of extracted files comprises the email message file;
determining a second amount of computing resources to allocate to a second software component based on the result of processing the first input by the disk image extraction component, wherein the second amount is less than the first amount, and wherein the second amount of computing resources is allocated to the second software component;
storing a second indication indicating that file extraction of the disk image is complete in a task table; and
sending the set of extracted files to the datastore as a second input.

2. The method of claim 1, further comprising:
generating a second notification indicating that the second input has been received at the datastore;
storing the second notification in the queue;
sending a second request for the second notification to the queue;
receiving the second notification;
determining, using the second notification, that a file type of the second input is an email message file type;
associating an email message file type label with the email message file;
storing a third indication of the email message file type in the evidence table;
sending the email message file and the email message file type label to the communication service, wherein the set of software component subscribers further comprises an email message extraction subscriber that subscribes to notifications for email message file types;
sending the email message file to the email message extraction subscriber;
determining extracted data as an output of the email message extraction subscriber, wherein the extracted data comprises text associated with the email message file and the pdf file;
storing a fourth indication indicating that file extraction of the email message file is complete in the task table; and
sending the extracted data to the datastore as a third input.

3. The method of claim 1, further comprising:
determining a user input indicating processing of the disk image to locate a file, wherein the user input comprises a first hash value associated with the file;
determining that a second hash value associated with the pdf file matches the first hash value; and
generating a notification indicating that the file is located.

4. The method of claim 1, further comprising:
determining a functionality associated with disk image extraction component;
determining, using the functionality, that the disk image extraction component is to be subscribed to the notifications for disk image file types; and
assigning the disk image extraction component to the notifications at the communication service, such that the disk image extraction component is invoked when a disk image file type is received.

5. A method comprising:
generating, by one or more computer processors coupled to memory, a first request for one or more notifications in a notification queue, wherein the one or more notifications comprises a first notification indicating that a first data input is present at a datastore;
determining a first data type of the first data input;
generating a second notification including an indication of the first data type;
determining that a first software component and a second software component are subscribed to notifications for the first data type;
sending the second notification to the first software component and the second software component;
determining a first amount of computing resources to allocate during processing of the first data input by the first software component and the second software component;
determining a first output of the first software component as a result of the first software component processing the first data input using the allocated first amount of computing resources, wherein the first output comprises a set of extracted data from the first data input;
determining a second amount of computing resources to allocate to the second software component during processing of the first data input by the second software component, wherein the second amount is less than the first amount; and
sending the set of extracted data to the datastore.

6. The method of claim 5, further comprising:
determining that the set of extracted data comprises data of a minimum size; and
determining that an iterative data extraction process is complete.

7. The method of claim 5, further comprising:
determining a second output of the second software component as a result of the second software component processing the first data input using the allocated second amount of computing resources, wherein the second software component is configured to process the first data input while the first software component processes the first data input.

8. The method of claim 5, further comprising:
receiving the first data input at the datastore; and
automatically selecting a process from a set of available processes for processing the first data input.

9. The method of claim 5, further comprising:
determining a search request indicative of data to be located in the first data input;
determining that the data is present in the set of extracted data; and
generating a search complete notification.

10. The method of claim 5, further comprising:
generating the first notification; and
storing the first notification in the notification queue.

11. The method of claim 10, further comprising:
determining that a first number of notifications in the notification queue meets a rate limiting threshold; and
determining a second number of notifications in the notification queue to include in a response to the first request.

12. The method of claim 5, further comprising:
generating a second request for a second notification indicating that a second data input is present at the datastore;
determining a second data type of the second data input;
generating a third notification including an indication of the second data type;
determining that a second software component is subscribed to notifications for the second data type;
sending the third notification to the second software component; and
sending a second output of the second software component to the datastore.

13. The method of claim 5, further comprising:
determining a functionality associated with the second software component;
determining, using the functionality, that the second software component is to be subscribed to the notifications for the first data type; and
assigning the second software component to the notifications, such that the second software component is invoked when data of the first data type is input at the datastore.

14. The method of claim 5, further comprising:
generating a data tag indicating the first data type for association with the first data input; and
sending the data tag to a communication service, wherein the communication service comprises a set of software component subscribers that subscribe to respective notifications from the communication service, and wherein the set of software component subscribers includes the first software component.

15. The method of claim 5, further comprising:
storing a first record of a first file type in the datastore; and
storing a second record in the datastore representing completion of file extraction.

16. A system comprising:
memory configured to store computer-executable instructions; and
at least one computer processor configured to access the memory and execute the computer-executable instructions to:

determine that a first notification is present in a notification queue, wherein the first notification indicates that a first data input is present at a datastore;

determine a first data type of the first data input;

generate a second notification including an indication of the first data type;

determine that a first software application is subscribed to notifications for the first data type;

send the second notification to the first software application;

determine a first amount of computing resources to allocate to the first software component during processing of the first data input by the first software component;

determine a first output of the first software component as a result of the first software component processing the first data input using the allocated first amount of computing resources, wherein the first output comprises a set of extracted data from the first data input;

determine a second amount of computing resources to allocate to a second software component based on the result of processing the first data input by the first software component; and send the set of extracted data to the datastore.

17. The system of claim 16, wherein the at least one processor is further configured to access the memory and execute the computer-executable instructions to:

determine that the set of extracted data comprises data of a minimum size; and determine that an iterative data extraction process is complete.

18. The system of claim 16, wherein the at least one processor is further configured to access the memory and execute the computer-executable instructions to:

determine that the second software application is subscribed to the notifications for the first data type;

send the second notification to the second software application; and determine a second output of the second software application as a result of the second software application being configured to process the first data input while the first software application processes the first data input.

19. The system of claim 16, wherein the at least one processor is further configured to access the memory and execute the computer-executable instructions to:

determine a search request indicative of data to be located in the first data input;

determine that the data is present in the set of extracted data; and generate a search complete notification.

20. The system of claim 16, wherein the at least one processor is further configured to access the memory and execute the computer-executable instructions to:

determine a functionality associated with the second software application;

determine, using the functionality, that the second software application is to be subscribed to the notifications for the first data type; and assign the second software application to the notifications, such that the second software application is invoked when data of the first data type is input at the datastore.

* * * * *